United States Patent
Boehm et al.

(10) Patent No.: US 6,658,424 B1
(45) Date of Patent: Dec. 2, 2003

(54) METHOD FOR THE DATABASE-SUPPORTED SELECTION OF PRODUCTS FOR ELECTRONIC-COMMERCE APPLICATIONS ON THE INTERNET

(75) Inventors: Andreas Boehm, Darmstadt (DE); Wolfgang Oberndorfer, Darmstadt (DE); Joerg Rahmer, Griesheim (DE); Stefan Uellner, Darmstadt (DE); Markus Haffner, Birkenau (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/807,856
(22) PCT Filed: Sep. 30, 1999
(86) PCT No.: PCT/EP99/07246
§ 371 (c)(1), (2), (4) Date: Oct. 24, 2001
(87) PCT Pub. No.: WO00/23923
PCT Pub. Date: Apr. 27, 2000

(30) Foreign Application Priority Data

Oct. 19, 1998 (DE) .......................... 198 49 354

(51) Int. Cl.$^7$ .............................. G06F 17/30
(52) U.S. Cl. ......................... 707/102; 707/10
(58) Field of Search ................ 707/4, 5, 10, 102; 705/14, 26, 35, 39; 709/217, 219

(56) References Cited

U.S. PATENT DOCUMENTS 5,737,592 A    4/1998  Nguyen et al.
5,960,411 A  * 9/1999  Hartman et al. ............. 705/26
6,175,823 B1 * 1/2001  Van Dusen ................... 705/26
6,397,212 B1 * 5/2002  Biffar ............................ 707/5

FOREIGN PATENT DOCUMENTS

DE   197 24 479    12/1998
EP   07 84 279      7/1997
EP   0 807 891     11/1997
EP   0 855 687      7/1998
WO   WO 98/40982    9/1998
WO   WO 98/57277   12/1998

OTHER PUBLICATIONS

*"Internet Access To Databases With User-Defined Fields", IBM Technical Disclosure Bulletin, US, IBM Corp., New York, vol. 40, No. 10, Oct. 1, 1997, pp. 133–134.

* cited by examiner

Primary Examiner—Diane D. Mizrahi
Assistant Examiner—Apu M Mofiz
(74) Attorney, Agent, or Firm—Kenyon & Kenyon

(57) ABSTRACT

The present mechanism offers customers a method for comparing products in electronic-commerce applications. The present invention further involves the accessing of a database management system, in which the user controls the product selection with the aid of control buttons. After data is read out from the database of the database management system and after converting an internal data structure containing the products/objects of the database, a product list can be created. By comparing the products in the product list to criteria for the desired product specified by the customer in the form of a comparison function, the objects selected on the basis of the comparison function can be entered into a result list and can be displayed to the customer. The invention can be used in e-commerce applications on the Internet because, among other things, it can make searching for products easier for the customer.

1 Claim, 4 Drawing Sheets

Figure 1:
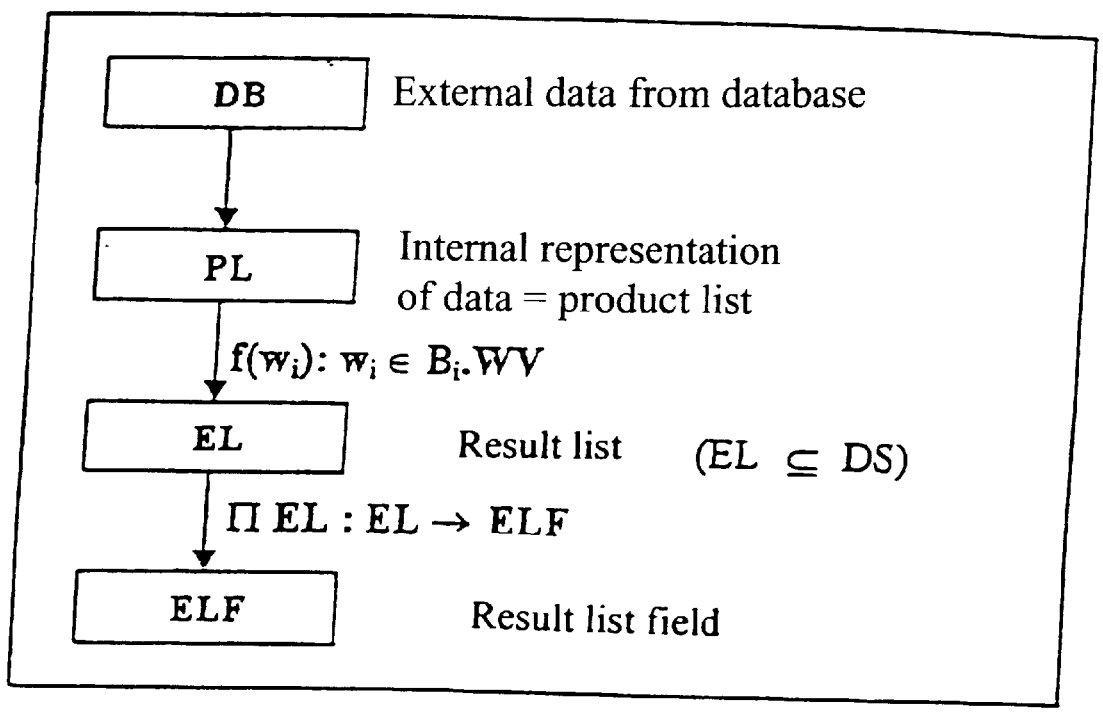

WV = Stock of values
B = Control button
i = { 1..n }

METHOD FOR THE DATABASE-SUPPORTED SELECTION OF PRODUCTS FOR ELECTRONIC-COMMERCE APPLICATIONS ON THE INTERNET

A relatively new way of offering and selling products is to use electronic commerce applications through the medium of the Internet.

E-commerce refers to the use of the technical means of electronic data networks to promote the economic and marketing processes of a company and to develop new marketing channels. The individual goals extend from corporate communications through the creation of value processes to the selling operation via all market phases. The following areas of application exist for e-commerce applications:

- Online shopping, e.g. advertising, product information, interaction between customer and seller;
- Customer service, e.g. technical documentation, installation and operating instructions; and
- Electronic Data Interchange (EDI), i.e. standardized data interchange between companies (including price lists, orders, invoices).

According to Krause, J *"Electronic Commerce Geschäftsfelder der Zukunft heute nutzen"*, Hanser-Verlag 1998 ISB 3-446-19378-2, the potential customer who has Internet access and wishes to use an e-commerce application expects the following:

- a complete offering, no fragments;
- comprehensive product information;
- clear statements regarding price, terms of guarantee, delivery conditions and service; and
- order confirmation by e-mail and, in the case of a lengthy delivery period, a corresponding message.

Described hereinbelow in detail as a known design approach is the e-commerce system of Deutsche Telekom AG (DTAG), which is similar to the e-commerce systems of many other companies.

The basis of the DTAG e-commerce system via the Internet, available under www.T-Versand.de, is the standard software Intershop. Intershop is a fully equipped medium which permits a smooth entry into the online market. Intershop technology goes beyond the typical limits of HTML pages and opens its own shopping center. Intershop is the first standardized software world-wide to allow the design of interactive, multimedia online shops. Intershop can be easily combined with existing merchandising or invoicing systems, can be operated as an autonomous system, or both.

The Intershop software programs are interfaced with the WWW server offering the HTML pages. Intershop has an integrated database which keeps the product catalog data in readiness. At the server end, e-commerce is usually provided by three components:

- WWW server
- e-commerce applications
- database with product catalog

The customer has the following possibilities for going to the homepage of T-Versand of DTAG:

- direct entry of the address "www.T-Versand.de" in the browser;
- via the Internet pages of DTAG; and
- via Internet catalogs.

If the potential customer has Internet access, of whatever technology, he/she can open the desired shop. Seen in practical terms, the customer enters a small store, searches on the homepage for the desired department and reaches the offerings there with just a few mouse clicks. The online shop begins with the selection of the product groups. In addition, the customer is able to read the general terms and conditions of business, to use a lexicon or to directly accept special offers. Furthermore, the customer can register, i.e. he can make himself known to the system in order to start the later transaction process. If, for example, the customer has selected the group "T-Net & analog terminals", he is presented with a further selection in which he can choose between various orientations of that group. With this selection, the customer is provided with more detailed explanations about what is offered in that category. That is, the customer ascertains whether he/she is on the right path to the desired product.

In the left-hand menu bar, the customer is able to switch to a different category at any time.

If the customer has selected the link "cord-bound telephones", he is next presented with the list of cord-bound terminals as the result. The customer thus arrives at a product selection list after only his third selection. This is an important principle which e-commerce shops should always observe. The product selection list now also shows a picture, the name, price and a brief description of the selected telephone. When the customer has selected a telephone, he can view the product data sheet which indicates the most important features. Here, the customer is able to take a look at the features and decide on the product. Thereafter, the customer has the following possibilities:

- place the telephone in the shopping basket;
- go back to the product list; or
- follow cross-references (e.g. accessories).

If the customer has decided to place a telephone in the shopping basket, the shopping basket serves the function of storing the products until the customer has finally decided to submit his order. The shopping basket offers the following functionalities:

- add product (with quantity);
- remove product from the shopping basket;
- display order value;
- display terms and conditions of delivery; and
- order products in the shopping basket.

In the majority of cases, the customer wishes either to purchase a product, to first obtain information about products and then make a purchase, or simply to obtain information about products. If a customer wishes to purchase a product and already knows his goal and usually the desired product he wishes to select as well, then the customer can easily make a purchase using the above-described system. However, those customers who are undecided or are seeking information have a more difficult time. Very often they have to switch pages in order to obtain information about the differences between the products on offer. The reason for this is that products can only be directly compared to each other by way of the values in the product data sheet. Although the current system offers the presentation of the DTAG catalogue in the Internet with full sales transaction handling, there is not enough support for the customer when searching for that product which is suitable for him. The reason for this in particular is that, owing to their length, the product lists are of only limited suitability for searching. Similar products described only by a brief text and a single picture can often not be properly differentiated. In order to compare features of products with each other, the customer must always have the respective product data sheet displayed and make a note of the most important features. Only then can he return to the product list and have another product or product data sheet displayed in order to compare its product data with the product data of the first product. This procedure places very great demands on the customer and is very time-consuming. Especially given high online costs, the customer will consider whether such time and effort is justified, since the printed catalogue supplies the same information content. It is even more difficult to compare products which are assigned to different categories. Here, the procedure is similar to that described above, only in this case, it is also necessary to switch between categories. An example of this is the comparison of D-Netz [D-Network] telephones with C-Netz [C-Network] telephones. If a customer does not have a certain basic knowledge or has not obtained information on certain products in advance, he will be overwhelmed by the product information in the product data sheet. In particular, he will not see the most important features of the products at a glance. A further deficiency is to be seen in the fact that the system offers the customer little in the way of assistance for solving his problem.

Proceeding from this related art, the object of the present invention is to develop a method for the customer-specific selection of products from a product catalogue via the Internet, in which the complete offering (product list) and comprehensive product information are retained, while the aforementioned deficiencies are eliminated. The invention is intended to provide the customer with a better and faster possibility for comparing products.

The objective is achieved by a method according to claim 1.

Known e-commerce applications are based on a database in which the products of the catalogue to be represented are managed and maintained.

However, the medium of the Internet makes it possible for the customer to view products from the databases much more efficiently than is possible with the known e-commerce applications, in which the relevant information, such as the current price, is not read out from the database and output until the product has been called up.

The method of the present invention, referred to hereinbelow as the product finder, is likewise based on a product catalogue. The difference with respect to known e-commerce applications is based on the fact that there is no tie to a group of products, but rather that certain products are selected with the aid of parameters defined beforehand by the customer during the online access.

The product finder includes static components which do not change or which are always executed in identical manner, and dynamic components which adapt to the parameters that have been previously defined, for example, by an administrator of the product finder. The effect of these parameters is that the correct components are set up in the user interface of the product finder, that the correct data are retrieved from the database, and that the data are also correctly further processed again with interaction of the user.

The components of a universally useable product finder are:
  database manager;
  product list;
  quantity of control buttons;
  results list;
  program control; and
  parameter list.

In addition to static constituents, the first five components also have dynamic constituents. On the other hand, the new component, the parameter list, is used by all the other components to initialize the product finder.

The most important information for a parameter of the parameter list is:
  table name;
  attribute name;
  control-button type;
  control-button label;
  initial value of the control button; and
  comparison operator.

It is useful to introduce further parameters in order to make the product finder universal in its application. Such parameters may be, for example:
  path of the database;
  path of the product images;
  colors in the product finder; and
  font in the product finder.

Table name and attribute name are relevant for the database in order to retrieve correct data for the internal data structure.

Control-button type, control-button label and initial value of the control button are important for the graphical interface and for the processing of the data from their value ranges. In the case of interactive selection, the comparison operator connects a value from the stock of values of the control button, to attributes of the internal data structure in order to compare them and to define the valid objects.

However, additional settings can also be introduced into the parameter list, such as the path of the images, the path of the database and further settings which are useful for the environment of the product finder. This information allows easy adaptation of the product finder to new areas of application.

The following static program elements form the basic skeleton of the product finder:
  general program control;
  function for graphic display; and
  button bar It is also advantageous to statically integrate certain control buttons for products (e.g. price of the product). Furthermore, it is useful if database accesses, which are performed within the product finder at every initialization and processing, are always performed. The graphical interface of the product finder includes four components:
  result list field;
  displayed picture;
  button bar; and
  groupings of control buttons.

Any number of such groupings should be produced which, in turn, may contain any number of control buttons.

The method for the database-supported selection of products for electronic-commerce applications on the Internet is based on the accessing of a database management system in which the user controls the selection of products with the aid of control buttons. As shown in FIG. 1, the method is composed of a plurality of method steps.

In the first method step, after the system has been started, data are read from the database of the database management system and are converted into an internal data structure (product of the product finder). A product list is formed from the instances of the product data structure.

In the second method step, a check is made with the aid of a comparison function as to whether the objects in the product list are valid. The valid objects are copied into a result list (list of valid objects). The comparison function is triggered by invoking the product finder or when a control button is changed by the user. In response to a change of state of a control button, the validity of the objects in the product list is checked on the basis of a comparison function compiled by the user/customer in accordance with his/her requirements. The comparison function is composed of the selected values of the control buttons, the associated attribute values of an object in the product list and a comparison operator for each selected value of the control button.

In a third method step, the valid objects determined on the basis of the comparison function are entered into a result list.

In a fourth method step, the result list is displayed to the user in a result list field. The user can make his/her selection on the basis of the objects in the result list field.

In the following, each step of the process sequence is explained in greater detail. First is a description of how the individual method steps are executed. It is then indicated which parameters are defined by the administrator. The data of the database are identified by table names and attribute names. In the product finder, these data are assigned to variables and formats. If a database is searched according to tables and attributes, the result obtained is a data record list. In order to store all the products in the product finder, there must be a similar data record list in the data structure of the product finder. This is implemented in the product finder, the data structure of the product finder containing a variable for each attribute of the database which is queried for the product finder. The result is that, for all the attributes of the database, a series of variables which precisely determines a product or product class is defined as a counterpart. In order to insert all the products into the product finder, each product is set up as an object in a list. This data list is hereinafter referred to as the product list. In the following table, the respective variable of the product finder is put opposite the attributes from the database. A series of variables is referred to as an array.

Figure 2:
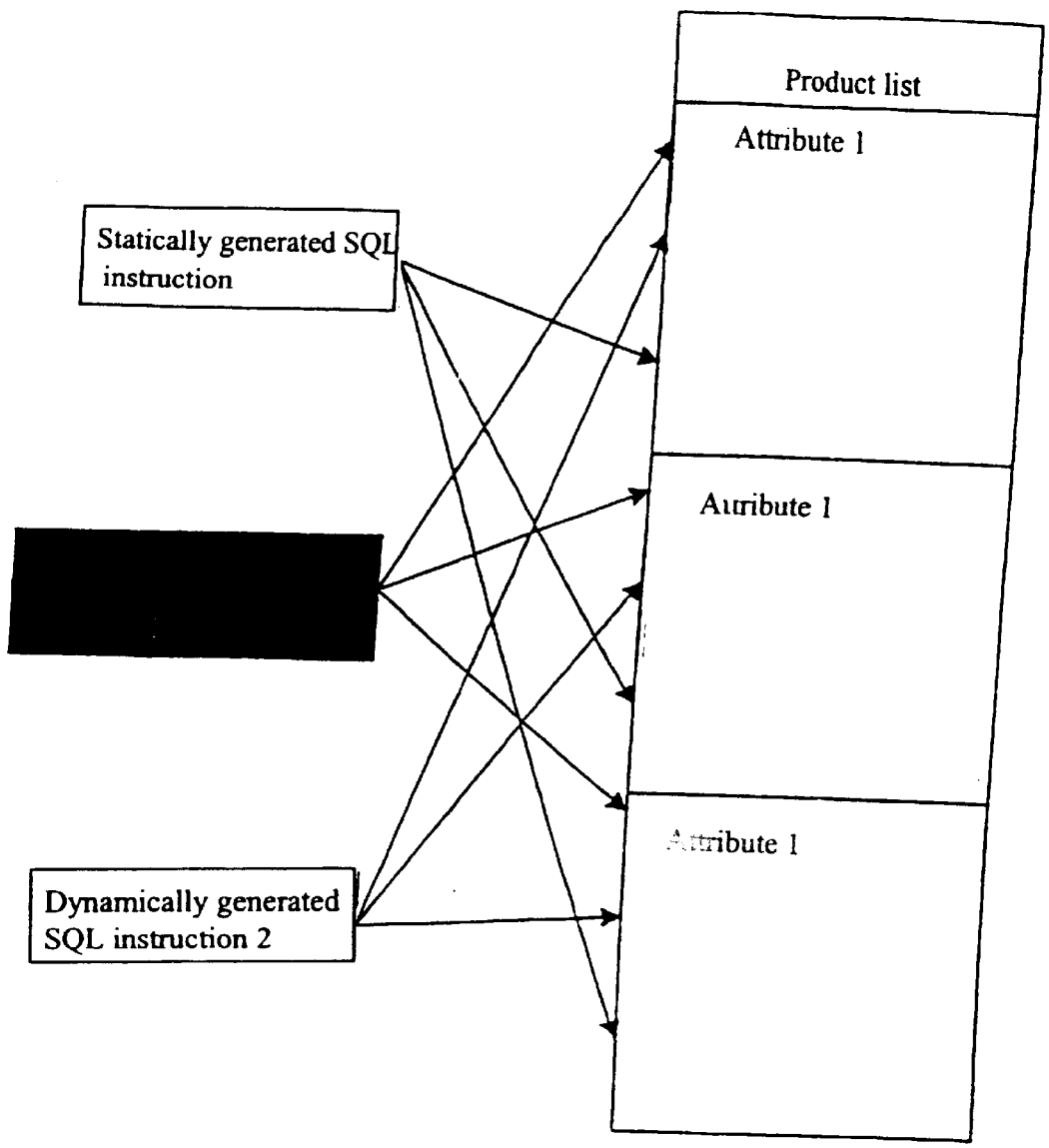

In order to fill the internal data structure, for each table and attribute combination, an SQL instruction must be generated which accesses the database and transfers the data into the product list. The data, which are always required in the data structure of the product finder, can be dealt with by a static SQL instruction and transferred into the product data structure. In order to generate correct dynamic SQL instructions, an administrator must define the quantity of table names and the associated attributes beforehand. The number of tables and attributes, respectively, thus also determines the number of attributes of an object in the product list. With reference to FIG. 2, it is demonstrated how two dynamic SQL instructions and one static SQL instruction are treated and how the respective attributes of the product list are filled. A control button is characterized by the labeling field, button type and stock of values. The labeling field defines the text which tells the later user of the product finder which features he/she can set with the control button. The type defines whether the button is, for example, a check field or a selection field. The stock of values is the quantity of values which can be set in the control button; these may be numbers, character strings or even truth values. In order to set up the control button in the product finder, the administrator must indicate the type and the labeling field. The stock of values of the control button originates from attribute values from the product list. In order to obtain the correct attribute values of the product list, there is a projection to their respective objects of the product list.

To summarize, it can be established that the filling of the stock of values is always determined by the control button and the associated values of an object in the product list. The parameters already defined (table name/attribute name of the database of the administrator), given extension by type and labeling field of the control buttons, also simultaneously define the origin of the stock of values.

Figure 3:
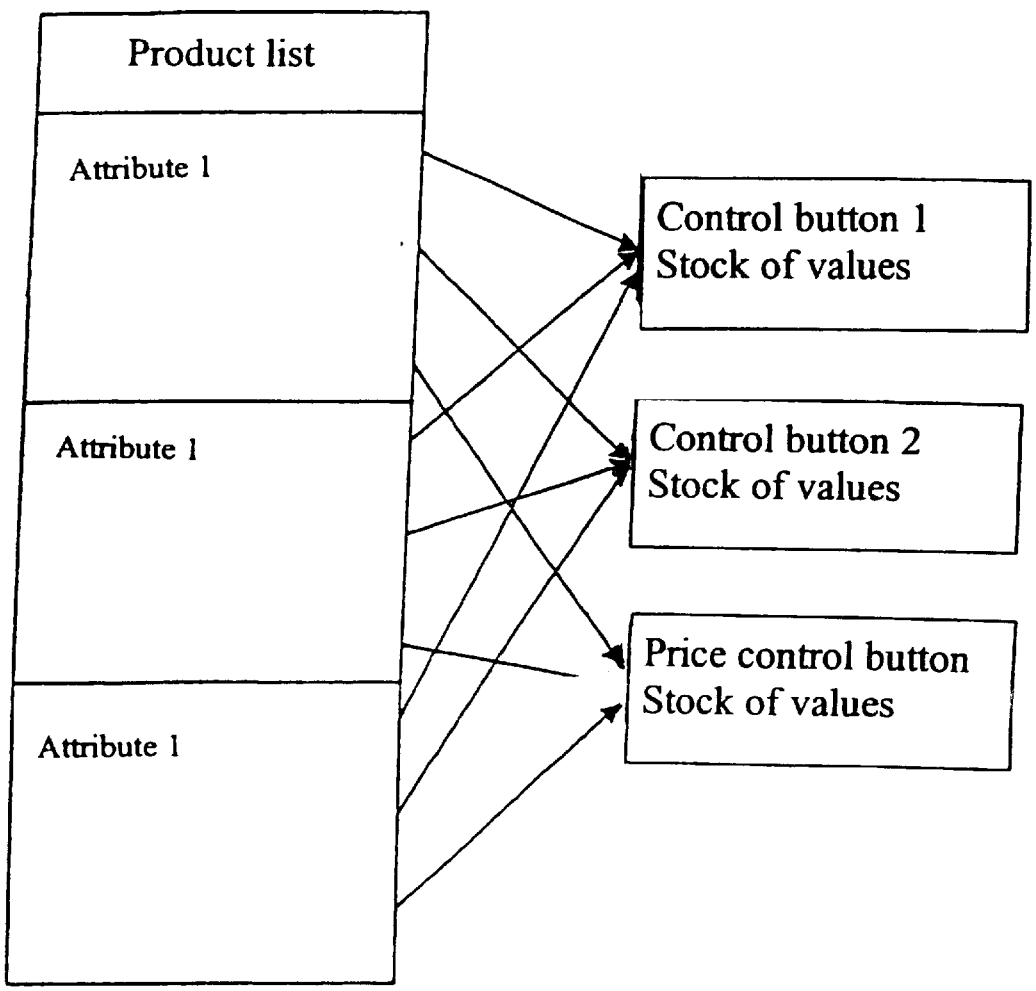

FIG. 3 shows an example in which two dynamic attributes and one static attribute of each of the objects in the product list fill the stocks of values of control buttons.

In the next step, a result list is created from the product list. Three components are provided in order to fill the result list:
  certain attributes of the product;
  a selected value from the stock of values of a control
    button; and
  a specified type of linkage.

If the value, again determined by a projection, of an attribute of an object in the product list yields a valid value linked with the value from the stock of values of the control button, then the entire object from which the attribute originates is valid and can be transferred into the result list if the other attributes with their types of linkage also yield valid values.

Figure 4:
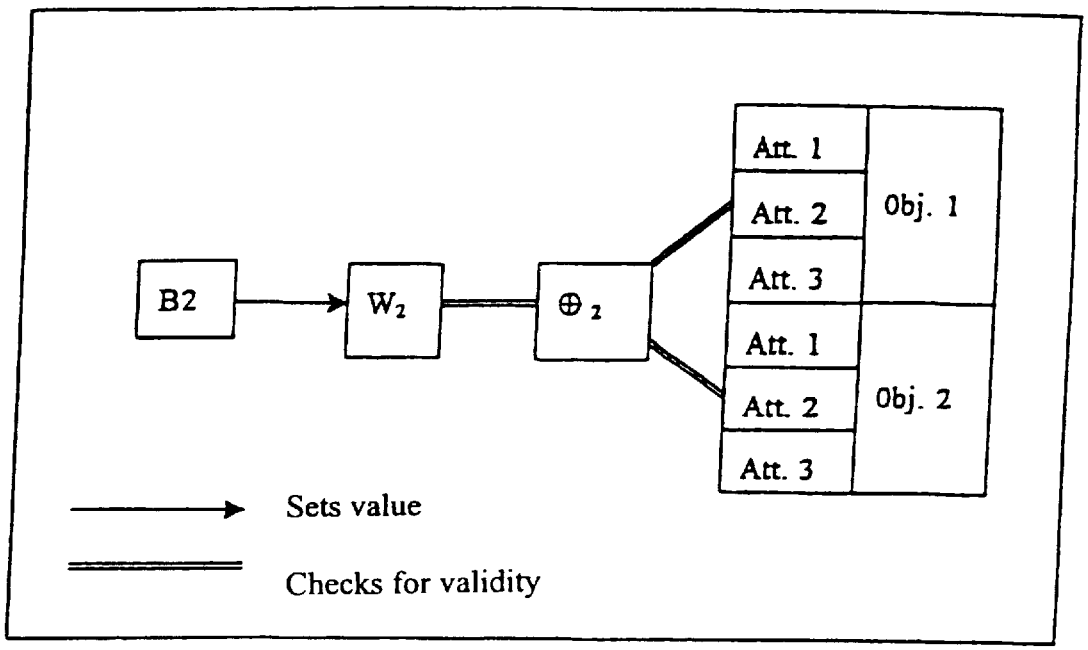

FIG. 4 illustrates the process of interactive selection with reference to an example. In the example, the system or the user sets value W2 from the stock of values of control button B2. This value is linked by comparison operator 2 to attribute Att. 2 of the product list and is checked for validity. If this validity is fulfilled and all the other validities are fulfilled as well, then precisely this object is copied into the result list. The same is done with all the other objects in the product list.

The values of all the valid objects are now in the result list. After the result list has been set up, the result list field is displayed for the user. The result list field is a projection from the result list, i.e. only certain attribute values of each object in the result list are taken over into the result list field. For the majority of product finders, it is useful to output the name and color of the product for the user.

Basically, there are two alternatives for integrating the product finder into the Internet: the product finder runs at the server end and only inputs/results are transferred from/to the customer. The second possibility is to transfer the product finder as a program to the computer or browser of the customer.

The first alternative can be achieved with the aid of CGI programming. An HTML form is sent to the customer from a server. The customer inserts his/her entries in the selection-settings form. Using a "Send" button, the results of the selection are sent to a CGI script at the server end. It would use the settings to select the correct products from a database of the database management system, and the result would again be sent back to the customer as an HTML form.

One advantage of this method is that the form is very small and can be transmitted quickly to the customer. A further advantage results from the fact that a database query proceeds very quickly on a powerful server. The transmission of the result in the form of an HTML page is also not time-critical. One disadvantage of this method is seen in the fact that, each time the customer varies his selection settings, he would have to press the "Send" button and thus would repeatedly have to set up a connection to the server. Such a server connection delays the provision of the desired result to the customer.

For the second alternative, in which the product finder runs at the client end, there are two possibilities for implementation.

The first possibility for implementation is based on a script which runs at the client, such as Java script or Visual Basic script.

The second possibility for implementing the product finder at the client end is based on programs which are integrated into the HTML pages to be transmitted. Such programs are, for example, Java applets or ActiveX components. One advantage of this variant is that it permits immediate interactivity with the customer. This means that the customer is able to make selections which are processed immediately and for which the result is available to the customer without any time delay.

The method of the present invention can be advantageously used in e-commerce applications on the Internet, because it makes it easier for the customer to search for products.

What is claimed is:

1. A method for database-supported selection of products for electronic-commerce applications on the Internet, comprising:

providing a database management system, wherein a user controls the selection of products using a control button;

activating the database management system;

reading out at least one data from a database of the database management system after activating the database management system, converting an internal data structure containing the products of the database and creating a product list containing objects;

checking validity of the objects in the product list when a state change of the control button is detected, wherein the state change of the control button is detected by a comparison function, wherein the comparison function (i) is composed by the user and (ii) includes a selected value of the control button, an associated attribute value of at least one object of the objects in the product list, and a comparison operator for each selected value of the control button;

entering the objects determined valid into a result list; and imaging the result list on a result list field, wherein the result list field is displayed to the user.

* * * * *